United States Patent
Jang et al.

(10) Patent No.: US 7,282,857 B2
(45) Date of Patent: Oct. 16, 2007

(54) PLANAR LIGHT SOURCE DEVICE AND DISPLAY APPARATUS HAVING THE SAME

(75) Inventors: Hyeon-Yong Jang, Osan-si (KR); Geun-Young Kim, Seoul (KR); Sang-Yu Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 389 days.

(21) Appl. No.: 10/982,249

(22) Filed: Nov. 5, 2004

(65) Prior Publication Data

US 2005/0099110 A1    May 12, 2005

(30) Foreign Application Priority Data

Nov. 8, 2003   (KR) ...................... 10-2003-0078890

(51) Int. Cl.
*H01J 61/00*    (2006.01)
(52) U.S. Cl. ...................... 313/581; 313/582; 313/493
(58) Field of Classification Search ..................... None
See application file for complete search history.

(56) References Cited

U.S. PATENT DOCUMENTS

| | | | | |
|---|---|---|---|---|
| 5,319,282 A | * | 6/1994 | Winsor | 315/169.4 |
| 6,100,635 A | * | 8/2000 | Winsor | 313/493 |
| 6,765,633 B2 | * | 7/2004 | Eom | 349/69 |
| 2002/0041144 A1 | * | 4/2002 | Fujishiro | 313/483 |
| 2005/0184666 A1 | * | 8/2005 | Park et al. | 313/607 |

* cited by examiner

*Primary Examiner*—Patrick Assouad
*Assistant Examiner*—Britt Hanley
(74) *Attorney, Agent, or Firm*—Cantor Colburn LLP

(57) ABSTRACT

A planar light source device includes a light source body having at least one partition member in a space formed by first and second substrates, and at least one plasma container. Plasma is generated in a plurality of discharge regions that are connected to one another through the plasma container. The plasma container is disposed at a position adjacent to the partition member to receive a portion of the plasma. According to this configuration, distribution of the plasma in the discharge regions is uniform and luminance of the light generated from the planar light source device is uniform. As a result, the planar light source device implements a good display quality of the LCD apparatus.

19 Claims, 7 Drawing Sheets

PLANAR LIGHT SOURCE DEVICE AND DISPLAY APPARATUS HAVING THE SAME

BACKGROUND OF THE INVENTION

1. Field of the Invention

The present invention relates to a planar light source device and a display apparatus having the planar light source device, more particularly, to the planar light source device capable of making uniform luminance and the display apparatus having the planar light source device.

2. Description of the Related Art

A display apparatus, generally, displays images using data that is processed by an information processing device. The display apparatus is classified into a cathode ray tube (CRT), a plasma display panel (PDP), a liquid crystal display (LCD) apparatus, an organic electro luminescent display (OELD) apparatus, etc. The LCD apparatus displays the image using liquid crystal.

In the LCD apparatus, the arrangement of the liquid crystal varies in accordance with an electric field applied thereto, and thus light transmittance may be changed. For example, the LCD apparatus displays the images using electric and optical characteristics of the liquid crystal. The LCD apparatus is slimmer and lighter than the CRT. Therefore, it is widely used in various electronic apparatuses, such as a portable computer, a communication equipment, a television receiver set, an aerospace device, etc.

A conventional LCD apparatus includes a liquid crystal controlling part that controls the liquid crystal, and a light supplying part that supplies the liquid crystal controlling part with light.

The liquid crystal controlling part includes a pixel electrode formed on a first substrate, a common electrode formed on a second substrate and the liquid crystal disposed between the pixel electrode and the common electrode. The liquid crystal controlling part includes a plurality of the pixel electrodes. The number of the pixel electrodes corresponds to a resolution of the LCD apparatus. The common electrode is disposed at a position corresponding to the pixel electrodes. A plurality of thin film transistors (TFT) are electrically connected to the pixel electrodes to apply pixel voltages to the pixel electrodes, respectively. The pixel voltages may be different from one another. A reference voltage is applied to the common electrode. The pixel electrode and the common electrode of the LCD apparatus include a transparent conductive material.

The light supplying part supplies the liquid crystal controlling part with the light. The light successively passes through the pixel electrode, the liquid crystal and the common electrode, so that the liquid crystal controlling part displays the image. Image display quality of the LCD apparatus improves in proportion to uniformity of the luminance of the light.

The light supplying part includes a cold cathode fluorescent lamp (CCFL) or a light emitting diode (LED). The CCFL has various characteristics, such as high luminance, high efficiency, long lifetime, thin thickness, light weight and low cost and so on. The CCFL and the LCD, however, have non-uniform luminance. Therefore, the light supplying part having the CCFL includes optical members, such as a light guide panel (LGP), a light diffusion member, a prism sheet, etc. to improve the uniformity of the light. When the light supplying part includes the optical members, the size and weight of the LCD apparatus increase.

Recently, a planar light source device has been developed to solve these problems. The planar light source device includes a light source body that forms a discharge space, and a plurality of partition members that divide the discharge space into a plurality of discharge regions. The planar light source device also includes electrodes that are formed the side of the light source body. Plasma in the discharge space is generated by a discharge voltage applied to the electrodes.

However, the conventional planar light source device has a problem that electric charges generated by the discharge voltage are concentrated on the edges of the partition members, thereby the uniformity of luminance becomes poor.

SUMMARY OF THE INVENTION

The present invention provides a planar light source device capable of making uniform luminance and decreased size and weight.

The present invention also provides an image display apparatus having the planar light source device.

In one embodiment, a planar light source device comprises a light source body including a first substrate, a second substrate facing the first substrate, at least one partition member disposed between the first and second substrates, the at least one partition member partitioning a space between the first and second substrates into a plurality of regions, at least one plasma container formed in the space, and a sealing member sealing the space between the first and second substrates; and voltage suppliers formed on both ends of the light source body in the direction that is substantially perpendicular to the longitudinal direction of the partition member.

The plasma containers are formed on one of the first and second substrates and at a position adjacent to at least one end of the partition members. Further, the plasma container may have a recess and may also have a protruded shape.

The light source body further comprises a reflection layer formed on the second substrate; and a second fluorescent layer formed on the reflection layer, the plasma container has a recess with laminated layers of the second substrate, the reflection layer, and the fluorescent layer.

In another embodiment, an image display apparatus comprises a planar light source device including a light source body having a first substrate, a second substrate facing the first substrate, at least one partition member disposed between the first and second substrates, the at least one partition member partitioning a space between the first and second substrates into a plurality of regions, at least one plasma container formed in the space, and a sealing member sealing the space between the first and second substrates; and voltage suppliers formed on both ends of the light source body in the direction that is substantially perpendicular to the longitudinal direction of the partition member; a receiving container to mount the planar light source device; and a flat panel to convert light generated from the planar light source device into images.

According to this configuration, distribution of the plasma generated in discharge regions is uniform and luminance of the light may be uniform.

The present application claims priority from Korean Patent Application No. 2003-78890, filed on Nov. 3, 2003, the disclosure of which is hereby incorporated herein by reference in its entirety.

BRIEF DESCRIPTION OF THE DRAWINGS

The above and other advantages of the present invention will become more apparent by describing in detail embodiments thereof with reference to the accompanying drawings, in which.

DETAILED DESCRIPTION OF THE INVENTION

Hereinafter, the present invention will be described in detail with reference to the accompanying drawings.

Figure 1:
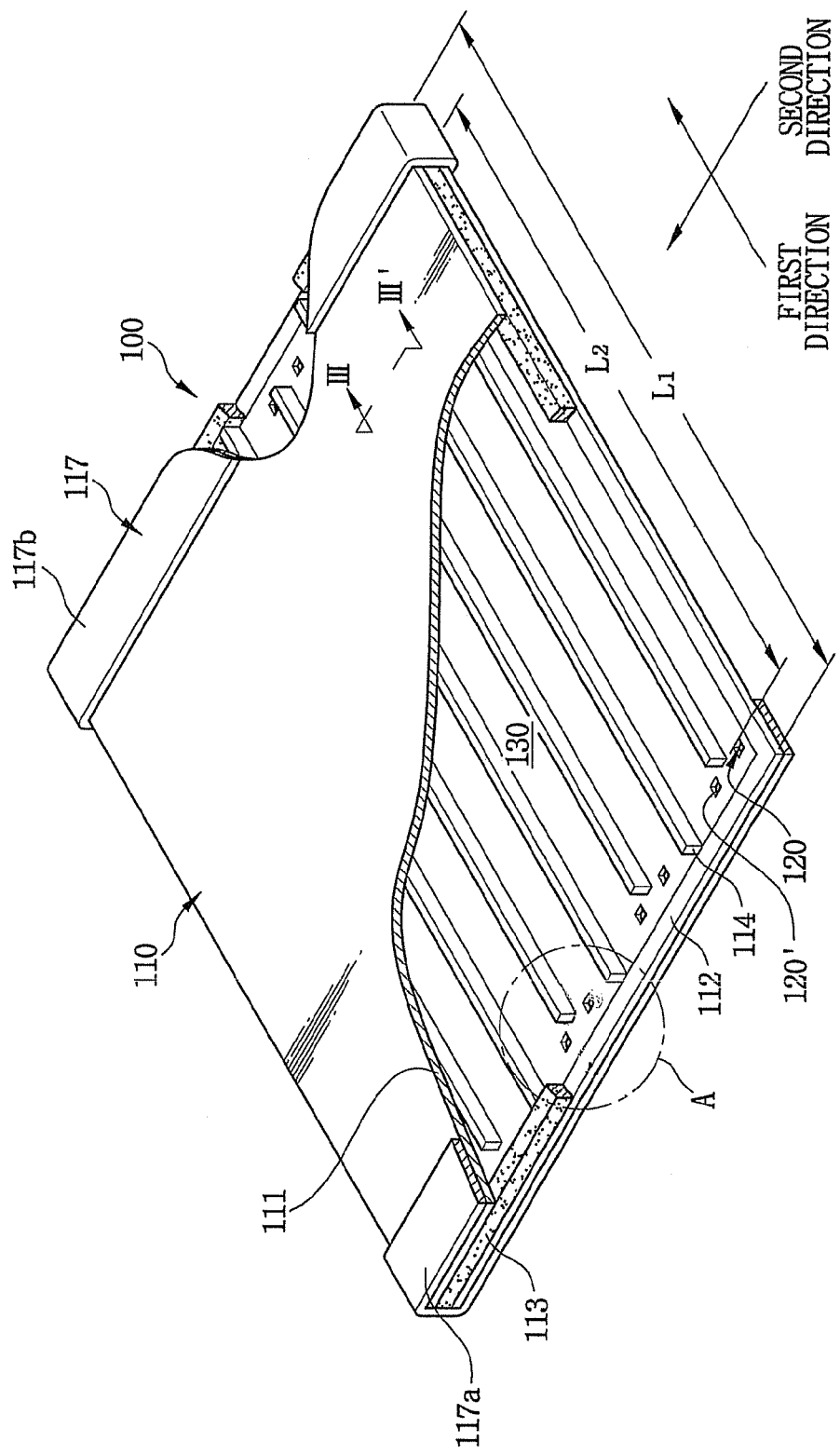
FIG. 1 is a partially cutout perspective view showing a planar light source device in accordance with an embodiment of the present invention.

FIG. 1 is a partially cutout perspective view showing a planar light source device in accordance with an embodiment of the present invention.

Referring to FIG. 1, the planar light source device 100 includes a light source body 110 and at least one voltage supplier 117. The light source body 110 includes a first substrate 111, a second substrate 112, a sealing member 113, partition members 114, and plasma containers 120.

The first and second substrates 111 and 112 are assembled by the sealing member 113 and have rectangular plate shapes. A shape and size of the first substrate 111 are substantially equal to those of the second substrate 112. In this embodiment, both the first and second substrates 111 and 112 are made of a transparent material, for example, a glass. The first substrate 111 is disposed at a position corresponding to the second substrate 112. The sealing member 113 is disposed between the first and second substrates 111 and 112 along the periphery of the first and second substrates 111 and 112. A thermal expansion coefficient of the sealing member 113 is substantially equal to that of the first and second substrates 111 and 112. Further, the planar light source device 100 includes discharge regions 130 that are formed by the partition members 114. The plasma containers 120 are formed on the second substrate 112 and at a position adjacent to at least one end of the partition members 114. Also the plasma container 120 may be formed on the first substrate 111.

According to this configuration, pressure distribution of discharge gases disposed in the discharge regions 130 may be uniform and electric charges are discharged in the discharge regions 130 to generate plasma. Further, an electric field is strongly applied to the plasma containers 120 and thus plasma is concentrated on the plasma containers 120. As a result, the plasma containers 120 prevent rapid movement of the plasma and luminance of the visible light is uniformized to improve uniformity of luminance of the visible light.

Figure 2:
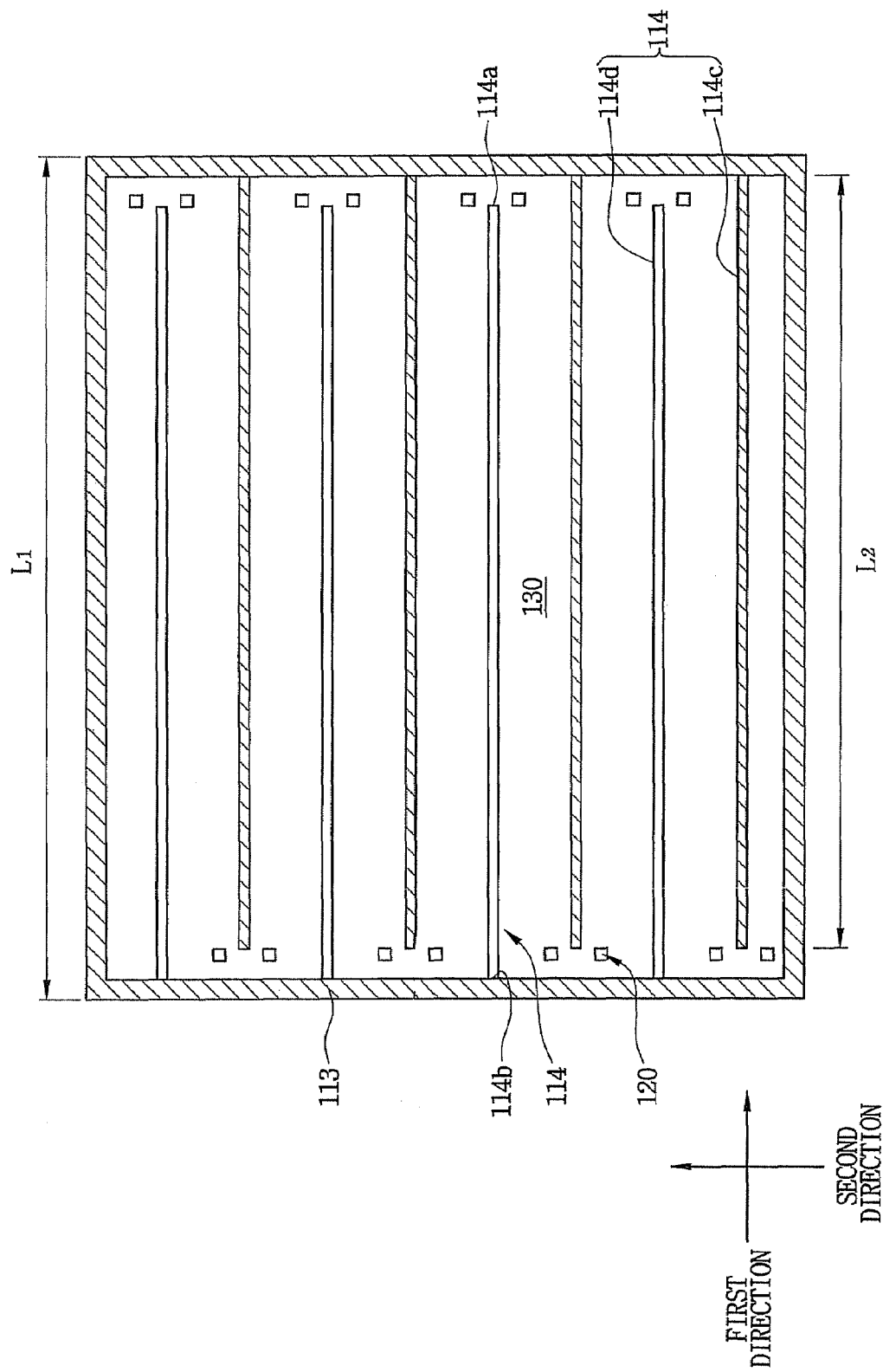
FIG. 2 is a cross-sectional view showing a planar light source device shown in FIG. 1.
Figure 3:
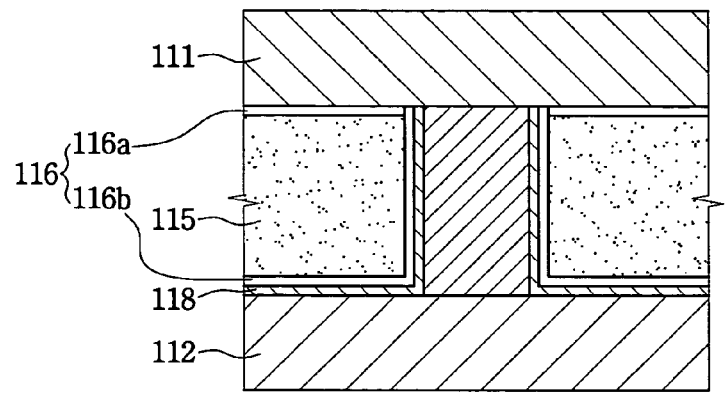
FIG. 3 is a cross-sectional view taken along line 3-3 shown in FIG. 1.

FIG. 2 is a cross-sectional view showing a planar light source device shown in FIG. 1. FIG. 3 is a cross-sectional view taken along line 3-3 shown in FIG. 1.

Referring to FIGS. 1 to 3, the light source body 110 further includes gas mixture 115, a fluorescent layer 116, and a reflecting layer 118.

The discharge regions 130 are connected to one another so that a first gas for generating the plasma and a second gas for generating the invisible light may be supplied to the discharge regions 130. According to this configuration, pressure of the first gas for generating the plasma in the discharge regions 130 may be uniformized, and pressure of the second gas for generating the invisible light in the discharge regions 130 may also be uniformized.

As shown in FIG. 2, a first length (L1) of the light source body 110 along the first direction is longer than a second length (L2) of each of the partition members 114 along the first direction. The partition member 114 includes a first end portion 114a and a second end portion 114b opposite to the first end portion 114a. The first end portion 114a is adjacent to the sealing member 113 and the second end portion 114b makes contact with the sealing member 113. The partition members 114 have two types, for example, a first partition member 114c and a second partition member 114d. The first end portion 114a of the first partition member 114c is adjacent to the second end portion 114b of the second partition member 114d, and the second end portion 114b of the first partition member 114c is adjacent to the first end portion 114a of the second partition member 114d. Therefore, the discharge regions 130 form a serpentine shape by the partition members 114.

The gas mixture 115 containing the first and second gases is injected into the discharge regions 130. Plasma is generated in the discharge regions 130 by the first gas and the invisible light is generated in the discharge regions 130 by the second gas. The first gas includes argon (Ar) and may include a portion of neon (Ne), krypton (Kr) or Xenon (Xe), etc. The argon generates plasma, and the neon, the krypton or the xenon, etc. decrease a voltage level for generating a penning discharge in the discharge regions 130. The first gas is charged into plasma by the discharge and then generates electrons. The second gas includes mercury (Hg) and collides with the electrons generated by the first gas. As a result, the invisible light is generated in the discharge regions 130. The invisible light may be an ultraviolet ray.

As shown in FIG. 3, the fluorescent layer 116 is disposed on inner surfaces of the light source body 110 and changes the ultraviolet ray into visible light. The fluorescent layer 116 includes a first fluorescent portion 116a and a second fluorescent portion 116b corresponding to the first fluorescent portion 116a. The first fluorescent portion 116a is disposed on an inner surface of the first substrate 111 and the second fluorescent portion 116b is disposed on an inner surface of the second substrate 112. The second fluorescent portion 116b may be disposed on the partition members 114. A liquefied fluorescent material may be coated on the first substrate 111 through a printing method to form the first fluorescent portion 116a. The liquefied fluorescent material may be coated on the second substrate 112 through a spraying method to form the second fluorescent portion 116b.

In this embodiment, the first and second substrates 111 and 112 are a transparent material, and the light generated in the discharge regions 130 is irradiated to the first and second substrates 111 and 112. The reflecting layer 118 is disposed between the second substrate 112 and the second fluorescent portion 116b to improve luminance of the light irradiated to the first substrate 111. A liquefied metal is sprayed on the second substrate 112 to form the reflecting layer 118. The reflecting layer 118 includes titanium oxide ($TiO_3$), aluminum oxide ($Al_2O_3$), etc.

Again referring to FIG. 1, the voltage supplier 117 is disposed in the light source body 110 to generate the plasma in the discharge regions 130. The voltage supplier 117 includes a first electrode 117a and a second electrode 117b. The first electrode 117a receives a first discharge voltage and the second electrode 117b receives a second discharge voltage from an inverter (not shown), respectively. The first and second discharge voltages form a voltage difference sufficient to transport electrons. Alternatively, the first and second electrodes may be disposed in the light source body 110. In this embodiment, the first and second electrodes 117a and 117b are disposed on the light source body 110 and at a position overlapping the plasma container 120. Further, the first and second electrodes may be formed the inner of the light source body 110. The first and second electrodes 117a and 117b may be formed on the outer or inner of the light source body 110 by tapping a conductive material or by forming it using a spray method. According to this configuration, the first and second electrodes 117a and 117b decrease the voltage difference between the first and second discharge voltages and decrease power consumption of the planar light source device 100. The plasma generates invisible light in the discharge regions 130 and the invisible light is then changed into visible light.

Figure 4:
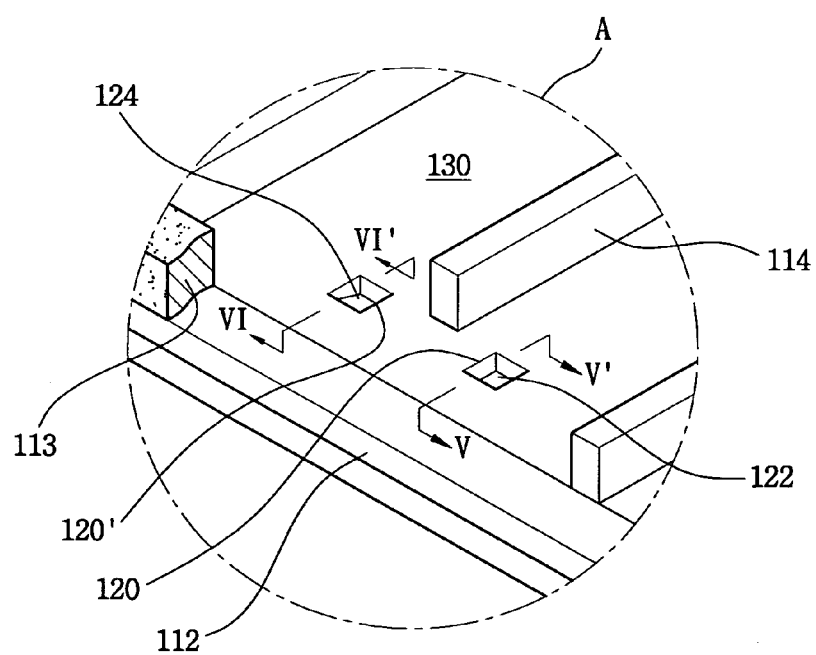
FIG. 4 is an enlarged perspective view showing the portion 'A' shown in FIG. 1.
Figure 5:
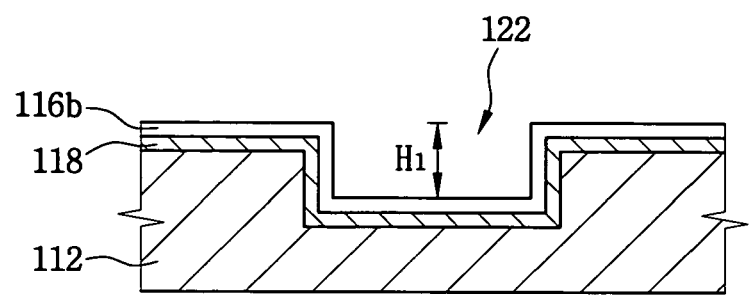
FIG. 5 is a cross-sectional view taken along line 5-5 shown in FIG. 4.

FIG. 4 is an enlarged perspective view showing the portion 'A' shown in FIG. 1. FIG. 5 is a cross-sectional view taken along line V-V' shown in FIG. 4.

Referring to FIGS. 4 and 5, the plasma container 120 includes a recess 122 with respect to a surface of the second substrate 112 by a predetermined depth. The depth of the recess 122 is represented by a reference numeral 'H1'. The recess 122 of the plasma container 120 has a rectangular bottom surface and may have a polygonal, a circular, an inclined bottom surface, etc. Alternately, the plasma container 120 may be a protrusion shape by a predetermined height with respect to the surface of the second substrate 112.

A portion of the plasma disposed in the plasma container 120 has a first density, and a remainder of the plasma disposed in each of the discharge regions 130 has a second density. The electrons are concentrated on the plasma container 120, so that density of the electrons in the plasma container 120 is denser than that of the electrons in the discharge regions 130. Even when the plasma container 120 has the protrusion shape electrons are also concentrated on a position adjacent to the protruded plasma container. Therefore, the first density is denser than the second density, so that an electric resistance of the plasma container 120 is lower than that of each of the discharge regions 130. When the electric resistance of each of the plasma container 120 decreases, the remainder of the plasma may not pass through the plasma container 120. As a result, distribution of the plasma is uniform.

Figure 6:
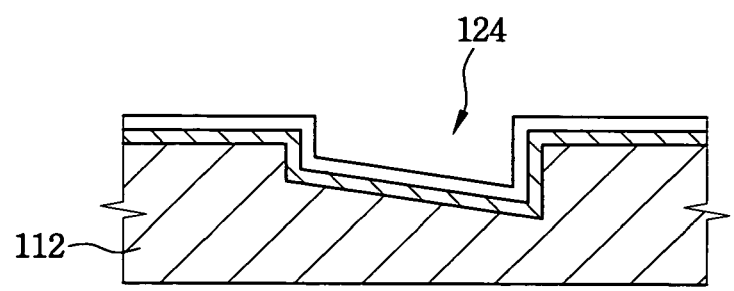
FIG. 6 is a cross-sectional view taken along line 6-6 shown in FIG. 4.

FIG. 6 is a cross-sectional view taken along line 6-6 shown in FIG. 4. Referring to FIGS. 4 and 6, the planar light source device 100 may also include at least one auxiliary plasma container 120'. The auxiliary plasma container 120' has a recess 124 with respect to the surface of the second substrate 112. The recess 124 has an inclined bottom surface with respect to the second substrate 112, for example, a downward inclined bottom surface from a position adjacent to the sealing member 113. Distribution of the plasma is uniform and luminance of the light generated from the planar light source device 100 is uniform.

Figure 7:
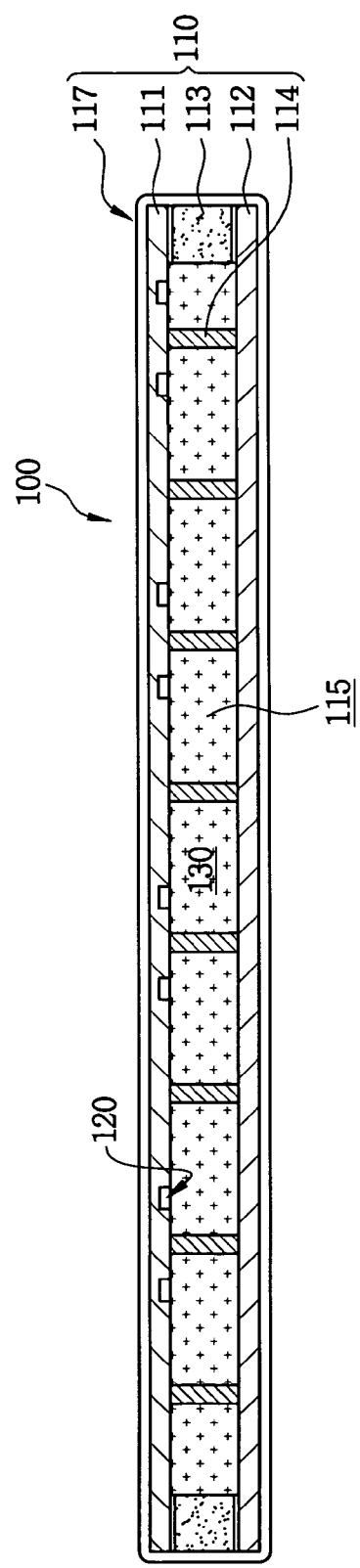
FIG. 7 is a cross-sectional view showing a planar light source device in accordance with another embodiment of the present invention.

FIG. 7 is a cross-sectional view showing a planar light source device in accordance with another embodiment of the present invention. The planar light source device 100 shown in FIG. 7 is same as in FIGS. 1 to 6 except for the plasma container. Thus, the same reference numerals will be used to refer to the same or like parts as those described in FIGS. 1 to 6 and any further explanation will be omitted.

Referring to FIG. 7, the plasma container 120 is disposed at an inner surface of a first substrate 111 facing a second substrate 112. As described above, density of plasma adjacent to the first substrate 111 is denser than that of plasma adjacent to the second substrate 112. Therefore, when the plasma container 120 is disposed at the inner surface of the first substrate 111, distribution of the plasma may be uniform.

According to this embodiment, the planar light source device 100 includes the plasma container 120 having a recess 122 with respect to the surface of the first substrate 111. As a result, distribution of the plasma is uniform and luminance of the light generated from the planar light source device 100 may be uniform.

Figure 8:
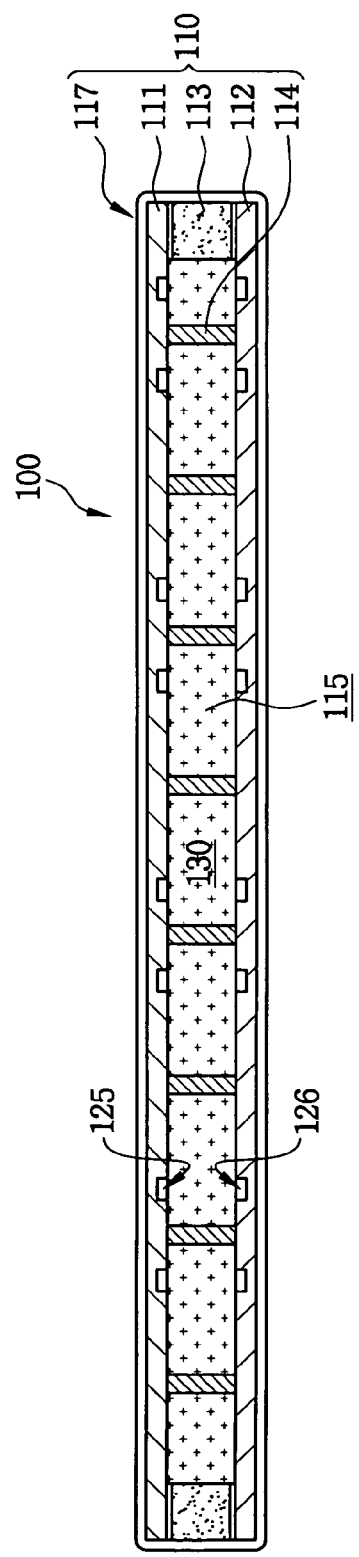
FIG. 8 is a cross-sectional view showing a planar light source device in accordance with another embodiment of the present invention.

FIG. 8 is a cross-sectional view showing a planar light source device in accordance with another embodiment of the present invention. The planar light source device 100 shown in FIG. 8 is same as in FIGS. 1 to 6 except for the plasma container. Thus, the same reference numerals will be used to refer to the same or like parts as those described in FIGS. 1 to 6 and any further explanation will be omitted.

Referring to FIG. 8, a plasma container includes a first plasma containing part 125 and a second plasma containing part 126. The first and second plasma containing parts 125 and 126 increase an amount of the plasma stored in the plasma container. The first plasma containing part 125 is disposed at an inner surface of a first substrate 111. The second plasma containing part 126 is disposed at an inner surface of a second substrate 112. The planar light source device 100 may include a plurality of the first and second plasma containing parts 125 and 126. The first plasma containing parts 125 may face the second plasma containing parts 126. Alternatively, the first and second plasma containing parts 125 and 126 may not face one another.

In this embodiment, the planar light source device 100 includes the first plasma containing part on the surface of the first substrate 111 and the second plasma containing part 126 on the surface of the second substrate 112. According to this configuration, distribution of the plasma is uniform and luminance of the light generated from the planar light source device 100 may be uniform.

Figure 9:
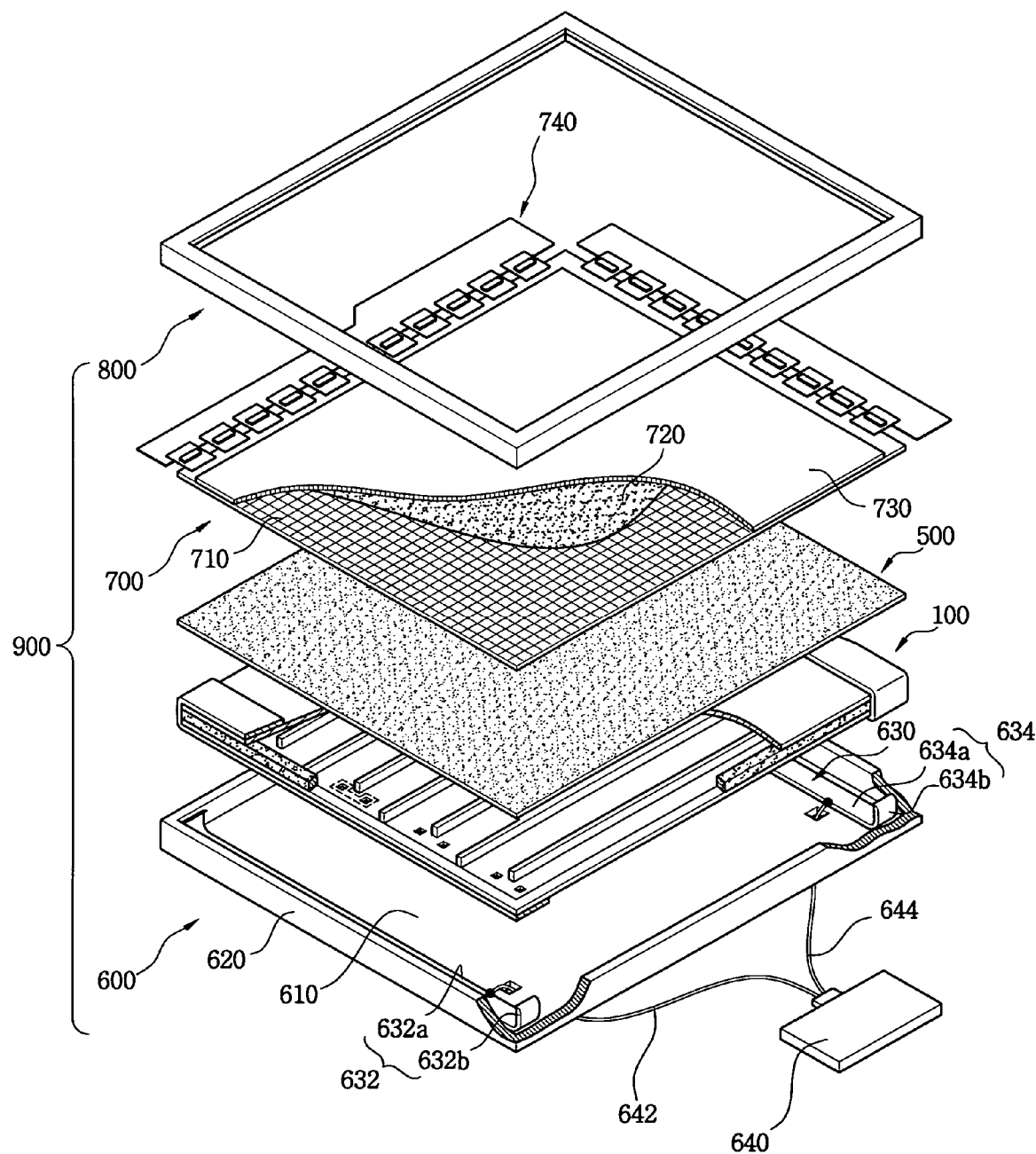
FIG. 9 is a partially cutout exploded perspective view showing a display apparatus in accordance with an embodiment of the present invention.

FIG. 9 is a partially cutout exploded perspective view showing an image display apparatus in accordance with an embodiment of the present invention. The image display apparatus includes a liquid crystal display (LCD) apparatus. The planar light source device 100 shown in FIG. 9 is same as in FIGS. 1 to 6. Thus, the same reference numerals will be used to refer to the same or like parts as those described in FIGS. 1 to 6 and any further explanation will be omitted.

Referring to FIG. 9, the LCD apparatus 900 includes a receiving container 600, the planar light source device 100, an LCD panel 700 and a chassis 800.

The planar light source device 100 includes at least one partition member 114. The partition member 114 forms a plurality of discharge regions 130. A voltage supplier 117 is disposed on a light source body to form plasma for generating invisible light in each of the discharge regions 130.

The light source body 110 includes at least one fluorescent layer and at least one plasma container 120. When the invisible light passes through the fluorescent layer, the invisible light is changed into visible light. The discharge regions 130 are connected to one another through the plasma container 120. The plasma container 120 prevents variation of density of the plasma disposed in each of the discharge regions 130.

The receiving container 600 includes a bottom surface 610, a plurality of sidewalls 620, a discharge voltage supplying module 630 and an inverter 640. The receiving container 600 secures the planar light source device 100 and the LCD panel 700 to prevent the planar light source device 100 and the LCD panel 700 from drifting.

The planar light source device 100 is disposed on the bottom surface 610, and the planar light source device 100 has the substantially same shape as the bottom surface 610. In this embodiment, the bottom surface 610 and the planar light source device 100 have a rectangular plate shape.

The sidewalls 620 protrude from sides of the bottom surface 610 to secure the planar light source device 100.

The discharge voltage supplying module 630 applies a discharge voltage to a voltage supplier 117 of the planar light source device 100. The discharge voltage supplying module 630 includes a first discharge voltage supplying portion 632 and a second discharge voltage supplying portion 634. The first discharge voltage supplying portion 632 includes a first conducting part 632a and a first conductive clip 632b that is formed on the first conducting part 632a. The second discharge voltage supplying portion 634 includes a second conducting part 634a and a second conductive clip 634b that is formed on the second conducting part 634a.

In this embodiment, the planar light source device 100 includes two voltage suppliers 117. The voltage suppliers 117 are secured with the first and second conductive clips 632b and 634b, respectively.

The inverter 640 applies the discharge voltage to the first and second discharge voltage supplying portions 632 and 634. A first conductive line 642 electrically connects the inverter 640 to the first discharge voltage supplying portion 632. A second conductive line 644 electrically connects the inverter 640 to the second discharge voltage supplying portion 634.

The LCD panel 700 changes light generated from the planar light source device 100 into image light having information. The LCD panel 700 includes a thin film transistor (TFT) substrate 710, a liquid crystal 720, a color filter substrate 730 and a driving module 740.

The TFT substrate 710 includes a pixel electrode, a TFT, a gate line and a data line. The TFT substrate 710 may include a plurality of the pixel electrodes, a plurality of the TFTs, a plurality of the gate lines and a plurality of the data lines.

The color filter substrate 730 includes a color filter and a common electrode. The color filter substrate 730 may include a plurality of the color filters. The color filter corresponds to the pixel electrode. The common electrode is formed on the color filter.

The liquid crystal 720 is disposed between the TFT substrate 710 and the color filter substrate 730.

The chassis 800 surrounds sides of the LCD panel 700 and the color filter substrate 730. A portion of the chassis 800 is hooked with the receiving container 600. The chassis 800 protects the LCD panel 700 and also secures the LCD panel 700 to the receiving container 600. A light diffusion member 500 is disposed between the LCD panel 700 and the planar light source device 100 to improve optical characteristics of the light generated from the planar light source device 100. Further, the light diffusion member 500 may have a light enhancement sheet on its upper surface. A mold frame supporting the light diffusion member 500 may be disposed between the light source device 100 and the light diffusion member 500.

According to the present invention, luminance of the light generated from the planar light source device is uniform to improve image display quality of the LCD apparatus.

This invention has been described with reference to the embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A planar light source device comprising:
a light source body including a first substrate, a second substrate facing the first substrate, at least one partition member disposed between the first and second substrates, the at least one partition member partitioning a space between the first and second substrates into a plurality of regions, at least one plasma container formed in the space, and a sealing member sealing the space between the first and second substrates; and
voltage suppliers formed on both ends of the light source body in a direction that is substantially perpendicular to a longitudinal direction of the partition member.

2. The planar light source device of claim 1, wherein the at least one plasma container is formed on one of the first and second substrates.

3. The planar light source device of claim 2, wherein electrodes of the voltage suppliers are disposed on the light source body at a position overlapping the at least one plasma container.

4. The planar light source device of claim 3, wherein the at least one plasma container is formed at a position adjacent to at least one end of the partition members.

5. The planar light source device of claim 4, wherein the at least one plasma container has a recess.

6. The planar light source device of claim 1, wherein the at least one plasma container is formed on both the first and second substrates.

7. The planar light source device of claim 6, wherein the at least one plasma container is formed at a position adjacent to at least one end of the partition members.

8. The planar light source device of claim 7, wherein the at least one plasma container has a recess.

9. The planar light source device of claim 7, wherein the at least one plasma container has a protruded shape.

10. The planar light source device of claim 1, wherein voltage suppliers are formed on the outer surface of the light source body.

11. The planar light source device of claim 3, the light source body further comprising:
a reflection layer formed on the second substrate;
a fluorescent layer formed on the reflection layer,
the at least one plasma container has a recess within laminated layers of the second substrate, the reflection layer, and the fluorescent layer.

12. An image display apparatus comprising:
a planar light source device including a light source body having a first substrate, a second substrate facing the first substrate, at least one partition member disposed between the first and second substrates, the at least one partition member partitioning a space between the first and second substrates into a plurality of regions, at least one plasma container formed in the space, and a sealing member sealing the space between the first and second substrates; and voltage suppliers formed on both ends of the light source body in a direction that is substantially perpendicular to a longitudinal direction of the partition member;

a receiving container to mount the planar light source device; and a flat panel to convert light generated from the planar light source device into images.

13. The image display apparatus of claim 12, further comprising an inverter.

14. The image display apparatus of claim 12, wherein the at least one plasma container is formed on one of the first and second substrates.

15. The image display apparatus of claim 14, wherein the at least one plasma container is formed at a position adjacent to at least one end of the partition members.

16. The image display apparatus of claim 15, wherein the at least one plasma container has a recess with one of a rectangular, a polygonal, a circular, and an inclined bottom surface.

17. The image display apparatus of claim 15, wherein the at least one plasma container is formed on both the first and second substrates.

18. The image display apparatus of claim 17, wherein the at least one plasma container is formed at a position adjacent to at least one end of the partition members.

19. The image display apparatus of claim 18, wherein the at least one plasma container has a recess with one of a rectangular, a polygonal, a circular, and an inclined bottom surface.

* * * * *